(12) United States Patent
Takamizu et al.

(10) Patent No.: US 6,378,950 B1
(45) Date of Patent: Apr. 30, 2002

(54) CHILD CAR SEAT AND HEAD REST FOR THE SAME

(75) Inventors: Nobuaki Takamizu; Mitsuru Washizuka; Kojiro Yamazaki, all of Urawa (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/661,785

(22) Filed: Sep. 14, 2000

(30) Foreign Application Priority Data

Sep. 14, 1999 (JP) .......................................... 11-260692

(51) Int. Cl.⁷ ................................................ B60N 2/26
(52) U.S. Cl. .................... 297/484; 297/250.1; 297/410; 297/467
(58) Field of Search .............................. 297/250.1, 410, 297/467, 484

(56) References Cited

U.S. PATENT DOCUMENTS

| | | | | |
|---|---|---|---|---|
| 326,184 A | * | 9/1885 | White ........................ 297/338 |
| 4,858,991 A | * | 8/1989 | Boyesen ................. 297/195.11 |
| 5,468,020 A | * | 11/1995 | Scime ......................... 280/808 |
| 5,655,817 A | * | 8/1997 | Nienow ...................... 297/465 |
| 5,701,968 A | * | 12/1997 | Wright-Ott et al. ......... 180/65.1 |
| 5,788,326 A | * | 8/1998 | Kawade et al. ............. 297/236 |
| 5,916,089 A | * | 6/1999 | Ive ................................. 5/655 |
| 5,971,485 A | * | 10/1999 | Clark .................... 297/423.12 |
| 6,030,047 A | * | 2/2000 | Kain ......................... 297/484 |
| 6,139,100 A | * | 10/2000 | Baskin-Lockman et al. ..... 297/250.1 |

* cited by examiner

Primary Examiner—Peter M. Cuomo
Assistant Examiner—Joseph Edell
(74) Attorney, Agent, or Firm—Wenderoth, Lind & Ponack, L.L.P.

(57) ABSTRACT

The instant invention pertains to a child car seat body including a headrest, an abdominal support and a mechanism interconnecting the abdominal support and the headrest such that as the headrest is lowered the abdominal support moves toward the headrest.

14 Claims, 12 Drawing Sheets

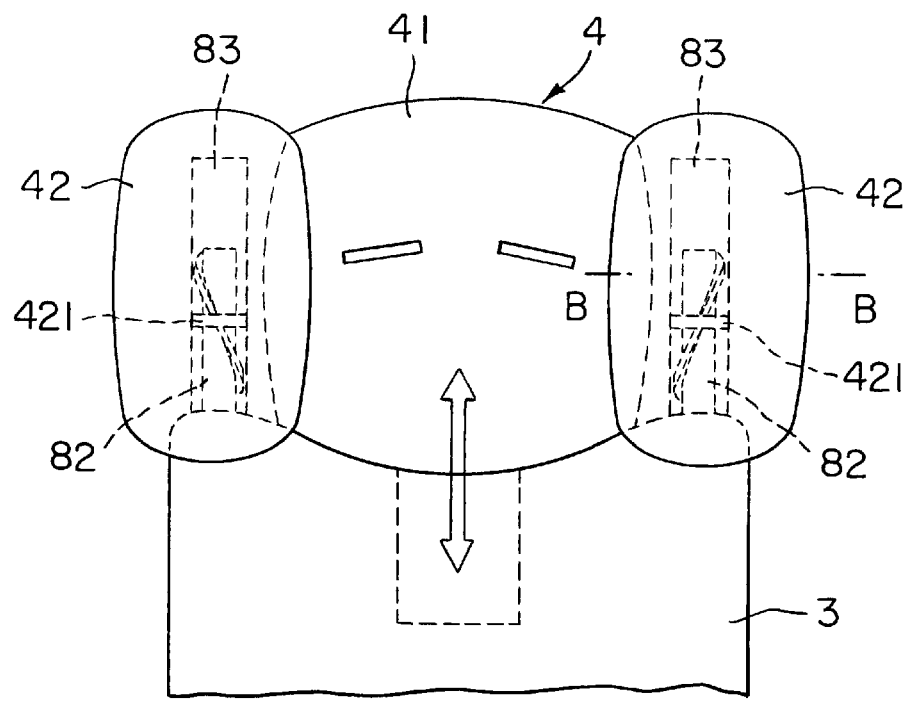
FIG. 8A
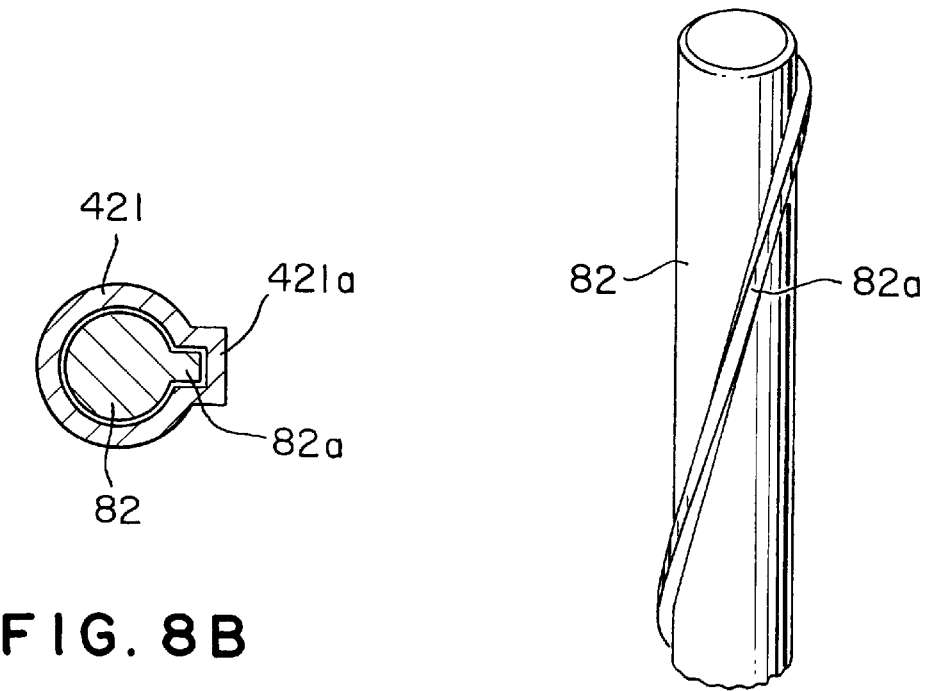
FIG. 8B
FIG. 8C

L1 > L2

CHILD CAR SEAT AND HEAD REST FOR THE SAME

BACKGROUND OF THE INVENTION

1. Field of the Invention

The present invention relates to a child car seat to be incorporated into a seat of an automobile, and a head rest for the child car seat and, more particularly, to a child car seat having shoulder straps and a head rest, in which the position of the shoulder straps and the height of the head rest can be easily adjusted according to the size of a child to be seated on the child car seat.

2. Description of the Related Art

A child car seat is used to secure safety for a child when carrying the child in an automobile. As shown in FIGS. 13 and 14, a child car seat 1, for instance, has a child car seat body 50 having a seat back A and a seat cushion B formed integrally with the seat back A, and a base 51 united integrally with the child car seat body 50. The base 51 is set on a seat of an automobile.

A crotch strap 52 is extended from a front central part of the seat cushion B and a buckle 55 is fixed to the crotch strap 52. Each of two belts 54 has a first end portion fixed to the seat cushion B and a second end portion passed through a shoulder belt slot 53 formed in the seat back A and extending on the back surface of the seat back A. The belts 54 are provided with tongues 56 that can be detachably joined to the buckle 55.

The second end portions of the belts 54 are fastened to a belt adjusting plate 57 on the back surface of the seat back A. A free end of a length adjusting belt 58 pulled out from a retractor is fastened to the belt adjusting plate 57. The retractor is placed inside a lower portion of the seat back A. The length adjusting belt 58 is extended outside the seat back A through a belt outlet 59.

A headrest 60 for firmly supporting the child's head is installed on an upper portion of the set back A so as to be vertically movable for height adjustment. Head supports 60a are fixedly attached to the opposite side ends of the headrest 60 to prevent the child's head from lateral sway.

As shown in FIG. 14, the base 51 or the child car seat body 50 is fastened directly to a seat of an automobile with a seat belt 61 of the automobile. The child is seated on the seat cushion B of the child car seat body 50 with the child's head placed between the belts 54, the child's shoulders fastened with the belts 54 and the child's legs stretched forward on the opposite sides of the crotch strap 52.

The shoulder belt slots 53 are formed in a plurality of pairs (three pairs in the child car seat shown in FIGS. 13 and 14). The pairs of shoulder belt slots 53 are arranged longitudinally. The upper pair of shoulder belt slots 53 is used for a larger child so that the child's shoulders are held down in an optimum mode.

In the conventional child car seat 1, the plurality of pairs of shoulder belt slots 53 are formed in a longitudinal arrangement in an upper portion of the back surface of the child car seat body 50, and one of the pairs of shoulder belt slots 53 is selected according to the child's build, and the shoulder belts are passed through the selected pair of shoulder belts lots 53. Accordingly, the conventional child car seat 1 requires troublesome work for the adjustment of the height of the shoulder belts, the height of the shoulder belts can be adjusted only in a stepwise adjusting method (three steps in the child car seat shown in FIGS. 13 and 14) and hence it is impossible to achieve optimum adjustment of the child car seat according to the child's build.

Although the headrest 60 can be vertically moved, head supports 60a are fixed to the headrest 60. Consequently, the child's head of a small width cannot be snugly fitted between the head supports 60a and the child's head cannot be securely held at three points by the head supports 60a and the headrest 60.

The interval between the crotch strap 52 and the seat back A cannot be adjusted. Therefore, the crotch belt 52 cannot be uniformly and securely applied to the abdomen and the chest of a child of a comparatively small build, and the crotch belt 52 exerts pressure on the abdomen of a child of a large build and makes the child feel cramped.

SUMMARY OF THE INVENTION

The present invention has been made in view of such problems and it is therefore an object of the present invention to provide a child car seat that does not require selection of holes for shoulder belts, enables stepless headrest height adjustment and the angular position of head supports, and has an abdominal support that can be moved toward the headrest, and a headrest for the child car seat.

According to a first aspect of the present invention, a headrest to be mounted on a child car seat body included in a child car seat for supporting a child thereon has an upper part for supporting the child's head, a middle part provided with shoulder belt slots through which a pair of shoulder belts fastening the child's shoulders are passed, and a lower part mounted on the child car seat body so as to be vertically movable for adjusting the height of the headrest.

According to a second aspect of the present invention a child car seat for supporting a child thereon has a child car seat body, a headrest mounted on the child car seat body so as to be movable for vertical position adjustment to hold the child's head, and a vertical position adjusting means associated with the child car seat body and the headrest.

The headrest can be moved in a nearly stepless mode for vertical position adjustment by a simple means, so that troublesome work for selecting suitable shoulder belt slots and passing shoulder belts through the shoulder belt slots can be omitted.

In the child car seat according to the present invention, the headrest has an upper part for supporting the child's head, a middle part provided with shoulder belt slots through which a pair of shoulder belts fastening the child's shoulders are passed, and a lower part mounted on the child car seat body.

In the child car seat according to the present invention, a groove is formed in the lower part of the headrest, the vertical position adjusting means includes a headrest support rail held on the child car seat body and supporting the lower part of the headrest for sliding movement, a rotating member rotatably supported on the headrest support rail and provided with a boss fitted in the groove of the lower part of the headrest, and a locking mechanism capable of locking and releasing the rotating member.

In the child car seat according to the present invention, the locking mechanism includes a polygonal member connected to a central portion of the rotating member, and a locking member provided with a through hole for releasably receiving the polygonal member therein.

In the child car seat according to the present invention, the vertical position adjusting means includes a pair of locking members supported on the headrest so as to be movable toward and away from the child car seat body, and a biasing member interposed between the pair of locking members so as to bias the pair of locking members away from each other and to cause the, pair of locking members to be frictionally engaged with the child car seat body.

In the child car seat according to the present invention, the pair of locking members have operating parts projecting outward from the child car seat body, respectively, and the biasing member can be compressed by the operating parts.

In the child car seat according to the present invention, the headrest has a headrest body and a pair of head supports rotatably provided on the opposite sides of the headrest body.

In the child car seat according to the present invention, an angular position adjusting means is provided to be associated with the pair of head supports and the child car seat body so as to rotate the pair of head supports for adjusting an angular position of the pair of head supports when the headrest is moved vertically.

In the child car seat according to the present invention, the angular position adjusting means includes shafts each supported on the child car seat body and provided on its circumference with a helical ridge, and grooved members placed in the pair of head supports and provided with grooves engaged with the helical ridges of the shafts supported on the child car seat body, respectively.

In the child car seat according to the present invention, the respective directions of the respective helical ridges of the pair of shafts are opposite to each other.

The headrest can be moved in a stepless mode in vertical directions for height adjustment by the simple means and the angular positions of the head supports can be adjusted when the headrest is moved for height adjustment. Therefore, the head can be satisfactorily stabilized by the head supports and the child car seat can be used for a long period of time in which a baby grows up to a child.

According to the present invention, the pair of head supports are linked to the headrest body, and the pair of head supports are rotated so that a space between the pair of head supports is narrowed when the headrest body is lowered relative to the child car seat body.

In the child car seat according to the present invention, the child car seat body is provided with an abdominal support to be set in contact with the child's abdomen, the abdominal support can be moved toward and away from the headrest, and the headrest and the abdominal support are interlocked by an interlocking mechanism that moves the abdominal support toward the headrest when the headrest is lowered.

The interval between the abdominal support and the seat back can be automatically adjusted as the headrest is moved vertically for height adjustment. Consequently, the child car seat is able to support the child comfortably and safely and can be easily handled.

BRIEF DESCRIPTION OF THE DRAWINGS

FIG. 8A is a front elevational view of a headrest provided with head supports showing a connecting relationship between the headrest and the head supports in a third embodiment according to the present invention;

FIG. 8B is a sectional view taken on line B—B in FIG. 8A;

FIG. 8C is an enlarged, fragmentary perspective view of a shaft shown in FIG. 8B;

DESCRIPTION OF THE PREFERRED EMBODIMENTS

First Embodiment

A child car seat in a first embodiment according to the present invention will be described with reference to FIGS. 1A to 4.

Figure 1A:
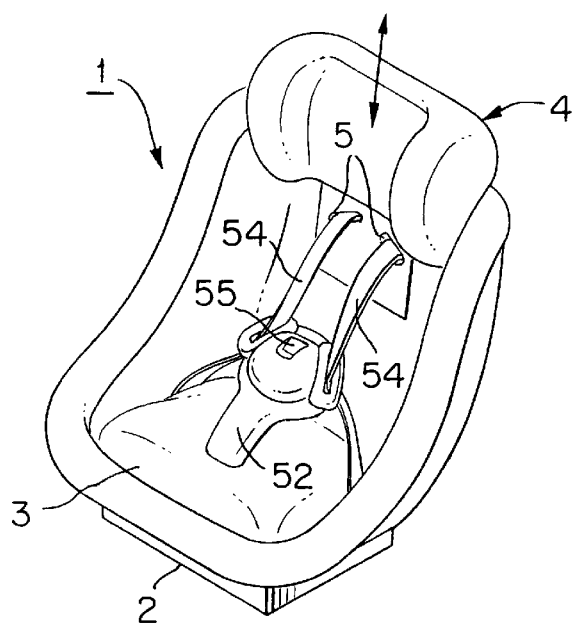
FIG. 1A is a front perspective view of a child car seat in a first embodiment according to the present invention.
Figure 1B:
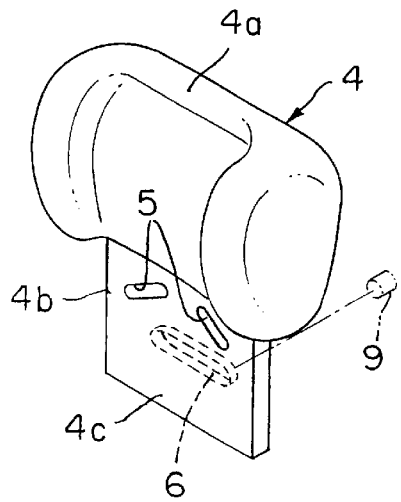
FIG. 1B is a front perspective view of a headrest included in the child car seat of FIG. 1A.
Figure 1C:
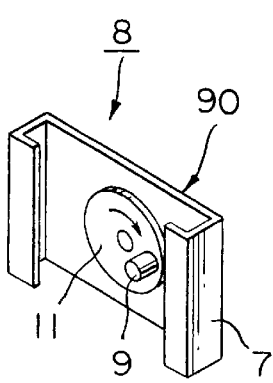
FIG. 1C is a front perspective view of a headrest support rail.
Figure 1D:
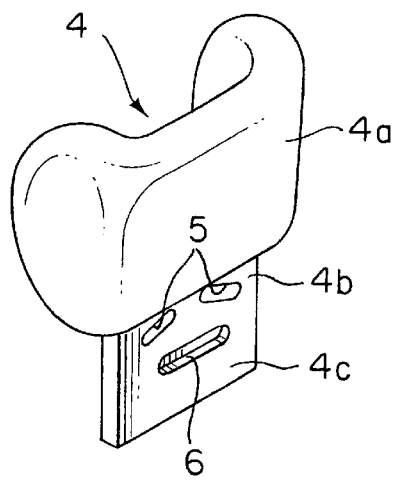
FIG. 1D is a rear perspective view of the head rest shown in FIG. 1B.

FIG. 1A is a front perspective view of the child car seat in the first embodiment, FIG. 1B is a front perspective view of a headrest, FIG. 1C is a front perspective view of a headrest support rail disposed behind the headrest shown in FIG. 1B and FIG. 1D is a rear perspective view of the head rest shown in FIG. 1B.

The child car seat 1 embodying the present invention for supporting a child K (FIGS. 9A and 9B) has a base 2, a child car seat 3 fixedly mounted on the base 2, and a headrest 4 installed in an upper middle portion of the child car seat body 3 so as to be vertically movable for position adjustment. The vertical position of the headrest 4 can be adjusted according to the size of the child K. The headrest 4 can be fixedly held at an optional vertical position by a vertical position adjusting mechanism 90 interposed between the child car seat body 3 and the head rest 4.

The headrest 4 has an upper part 4a on which the head H of the child K rests, a middle part 4b provided with a pair of shoulder belt slots 5 through which shoulder belts 54 are passed and a lower part 4c supported on the child car seat body 3 so as to be moved vertically for position adjustment. The vertical position of the shoulder belt slots 5 changes as the headrest 4 is moved vertically.

As shown in FIG. 1D, a laterally elongate groove 6 is formed in the back surface of the lower part 4c of the headrest 4, and a boss 9 shown in FIG. 1C is fitted in the laterally elongate groove 6. The boss 9 is fixed to a rotating member 8 supported for rotation on a headrest support rail 7. The headrest support rail 7 is incorporated into the child car seat body 3. As shown in FIG. 1A, the shoulder belts 54 provided with tongues 56 that can be detachably joined to a buckle 55 are fixed to the child car seat body 3. The child car seat body 3 is provided with an abdominal support 52.

Figure 2:
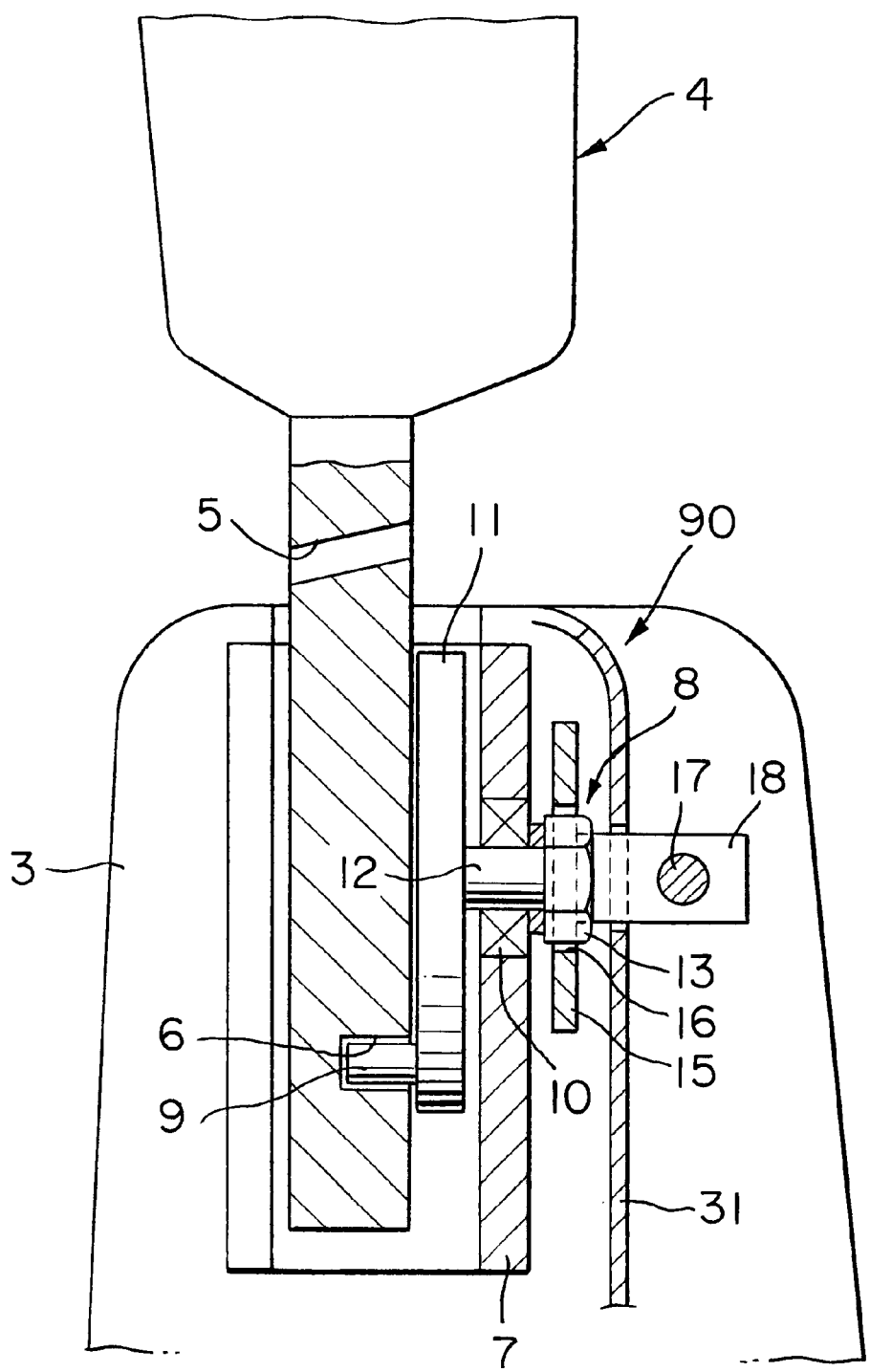
FIG. 2 is a fragmentary longitudinal sectional view of a headrest support part of the child car seat shown in FIG. 1A.
Figure 3:
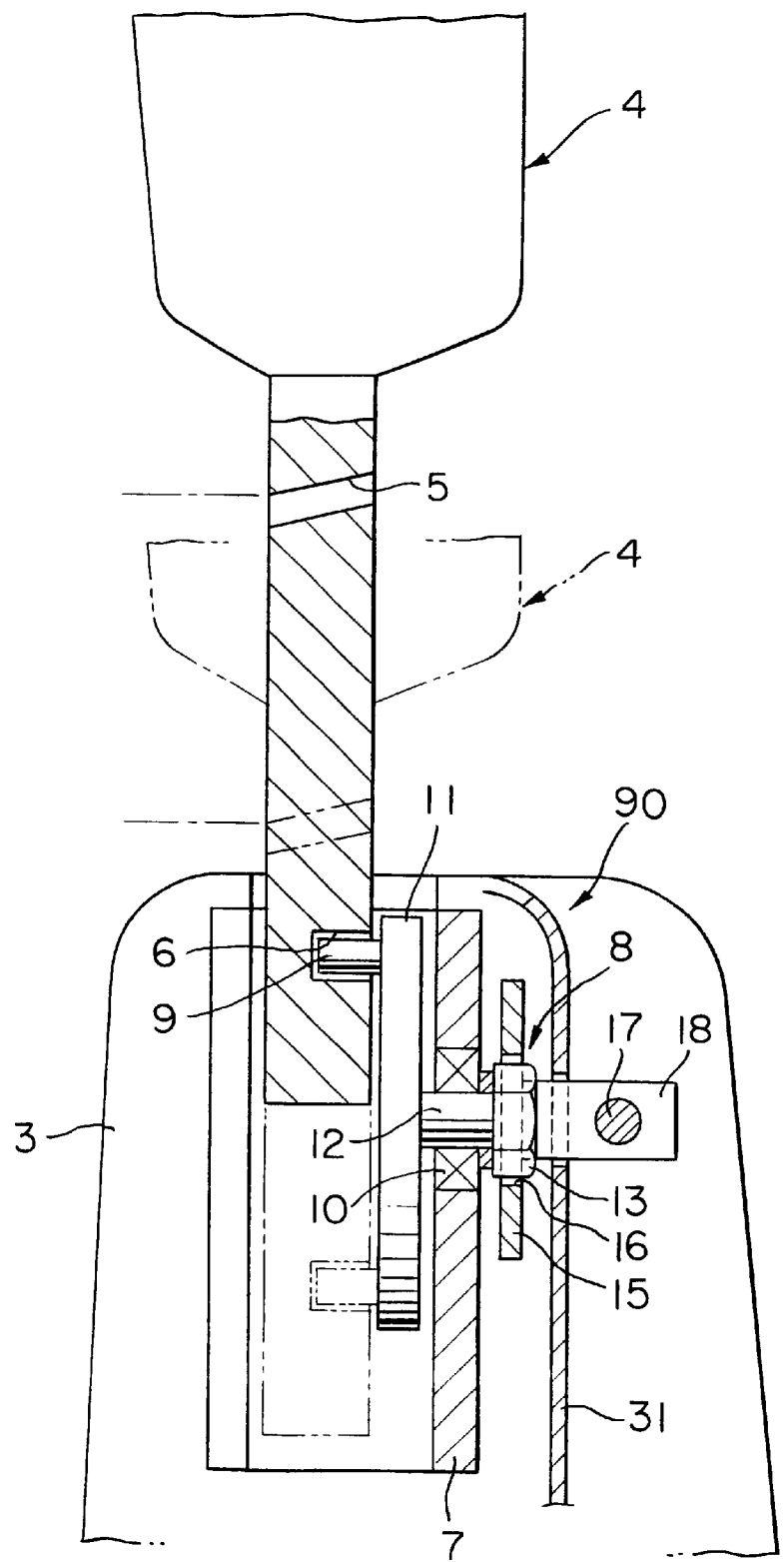
FIG. 3 is a fragmentary longitudinal sectional view of assistance in explaining upper and lower limit positions of the head rest included in the child car seat shown in FIG. 1A.

FIGS. 2 and 3 show the positional relationship between the headrest 4, the headrest support rail 7 and the rotating member 8. The head rest 4 is lowered to its lower limit position in FIG. 2 and the same is raised to its upper limit position in FIG. 3.

Referring to FIGS. 2 and 3, the headrest support rail 7 is fixed to the child car seat body 3. The rotating member 8 is supported in a bearing 10 on the headrest support rail 7. The rotating member 8 has a disk 11 fixedly holding the boss 9 on a peripheral part thereof, a shaft 12 coaxial with the disk 11, and a polygonal head (hexagonal head) 13 formed on one end of the shaft 12. The polygonal head 13 may have three or more sides. The polygonal head 13 comes into contact with a mating member (locking member) 15 at a plurality of contact edges, has an increased strength and becomes steady.

A crank cam employing a rectangular plate may be used instead of the disk 11.

Figure 4:
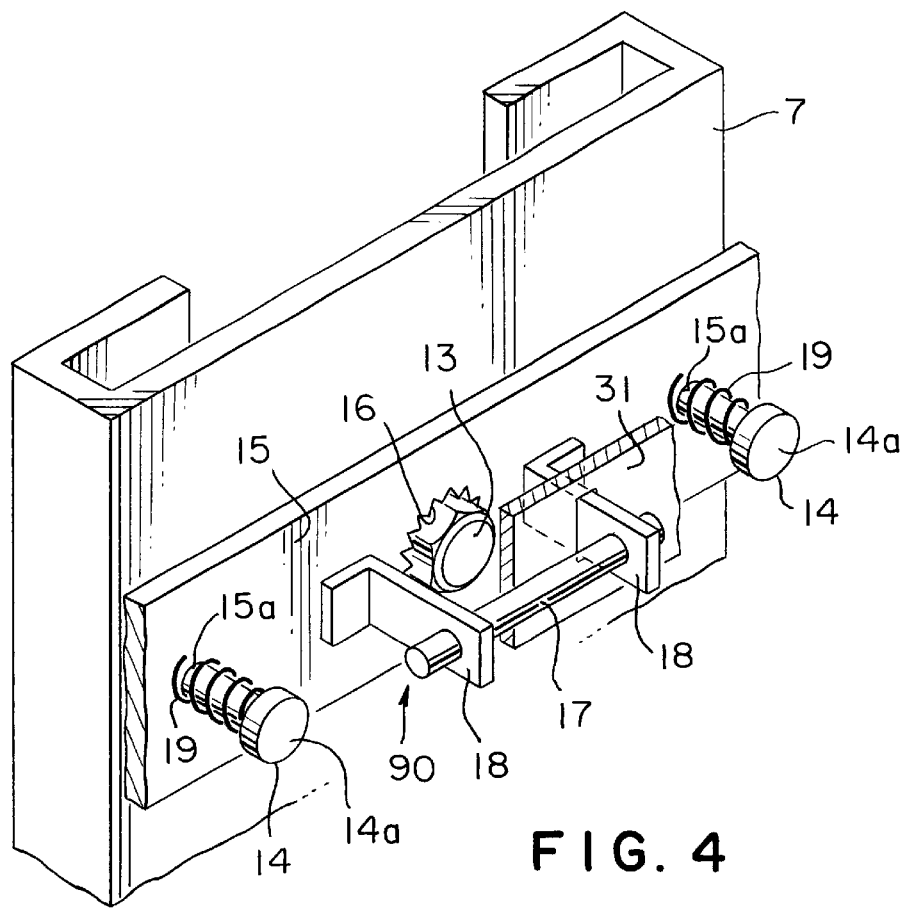
FIG. 4 is a perspective view of a locking member elastically supported on the headrest support rail.

Referring to FIG. 4, support pins 14 each having a head 14a are attached to the headrest support rail 7. The support pins 14 are extended through openings 15a formed in a plate-shaped locking member 15 to support the locking member 15 on the headrest support rail 7. Compression coil springs 19 are extended between the locking member 15 and the heads 14a of the support pins 14 to press the locking member 15 against the headrest support rail 7.

The locking member 15 is provided with a through hole 16 of a shape capable of receiving the polygonal head 13 therein. Normally, the polygonal head 13 is fitted in the through hole 16 and is restrained from turning relative to the locking member 15. The through hole 16 is similar, for example, to the opening of a box wrench having engaging grooves extending at angular pitches of 30° resembling the arrangement of petals of a flower. Therefore, the locking member 15 provided with the through hole 16 is able to determine the angular position of the polygonal head 13 in twelve steps by the combination of the opening 16 and the hexagonal head 13.

A pair of L-shaped brackets 18 are attached to the locking member 15 and a handle 17 is attached to the pair of brackets 18 so as to extend between the pair of brackets 18. The handle 17 is exposed on the back surface of the child car seat body 3 so that the handle 17 can be easily pulled. When the handle 17 is pulled away from the child car seat body 3 against the pressure of the compression coil springs 19 to move the locking member 15 away from the headrest support rail 7, the locking member 15 is disengaged from the polygonal head 13.

The polygonal head 13 and the locking member 15 form a locking mechanism 13, 15. The headrest support rail 7, the rotating member 8 and the locking mechanism 13, 15 constitute the vertical position adjusting mechanism 90.

When it is desired to move upward the shoulder belt slots 5, the handle 17 is pulled away from the child car seat body 3 to disengage the locking member 15 from the polygonal head 13 to make the rotating member 8 free. Then, the headrest 4 is pulled up. Consequently, the boss 9 fitted in the laterally elongate groove 6 is pushed up, and the rotating member 8 is turned as is the polygonal head 13 (a hexagonal head in this embodiment). After the headrest 4 has been set at a desired height, the handle 17 is released. Then, the locking member 15 is pressed against the headrest support rail 7 by the pressure of the compression coil springs 19, the polygonal head 13 is fitted in the polygonal through hole 16 of the locking member 15. Consequently, the polygonal head 13 is restrained from turning (locked) and the headrest 4 is fixed in place.

Thus, the headrest 4 can be set at a height between the lower limit position indicated by two-dot chain lines and the upper limit position indicated by solid lines in FIG. 3.

Since the through hole 16 has twelve small angular grooves circumferentially arranged at small angular pitches, the polygonal head 13 having, for example, a hexagonal shape can be easily fitted in the through hole 16.

If the polygonal head 13 cannot be fitted in the through hole 16, the angular position of the polygonal head 13 can be changed so that the polygonal head 13 can be fitted in the through hole 16 by slightly raising or lowering the headrest 4.

Second Embodiment

A headrest 4 in a second embodiment according to the present invention will be described with reference to FIGS. 5 to 7.

Figure 5:
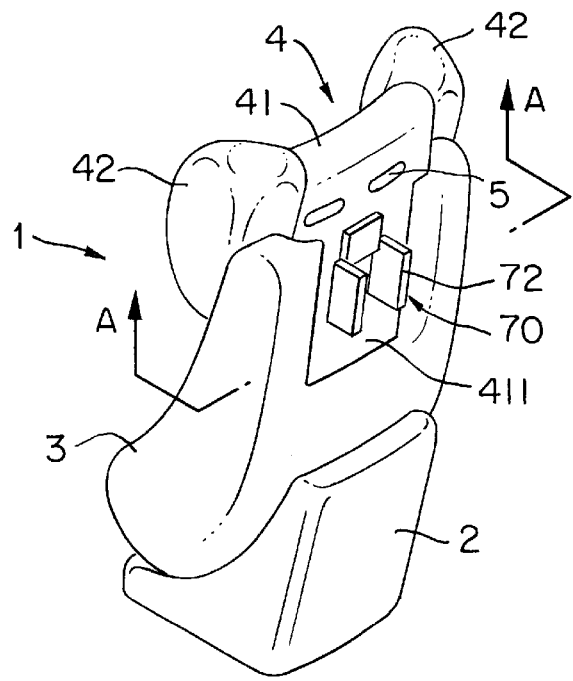
FIG. 5 is a rear perspective view of a child car seat provided with a headrest in a second embodiment according to the present invention.
Figure 6:
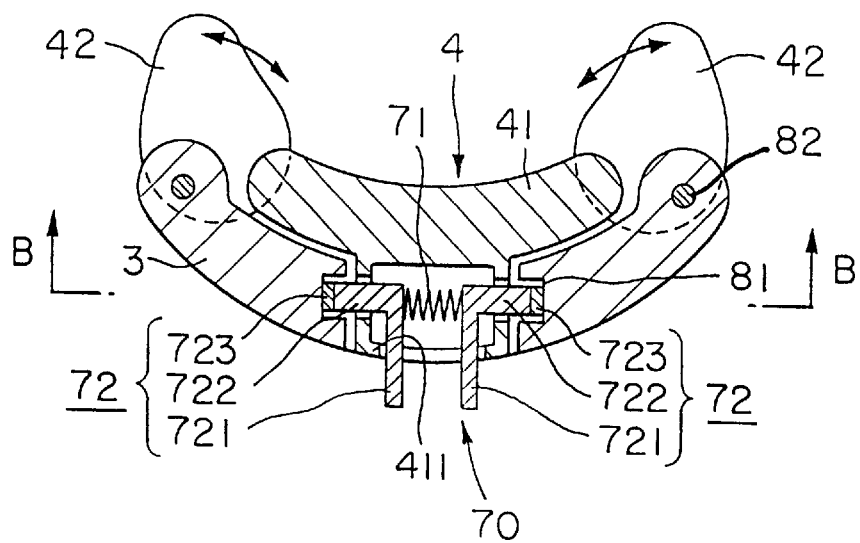
FIG. 6 is a sectional view taken on line A—A in FIG. 5.
Figure 7:
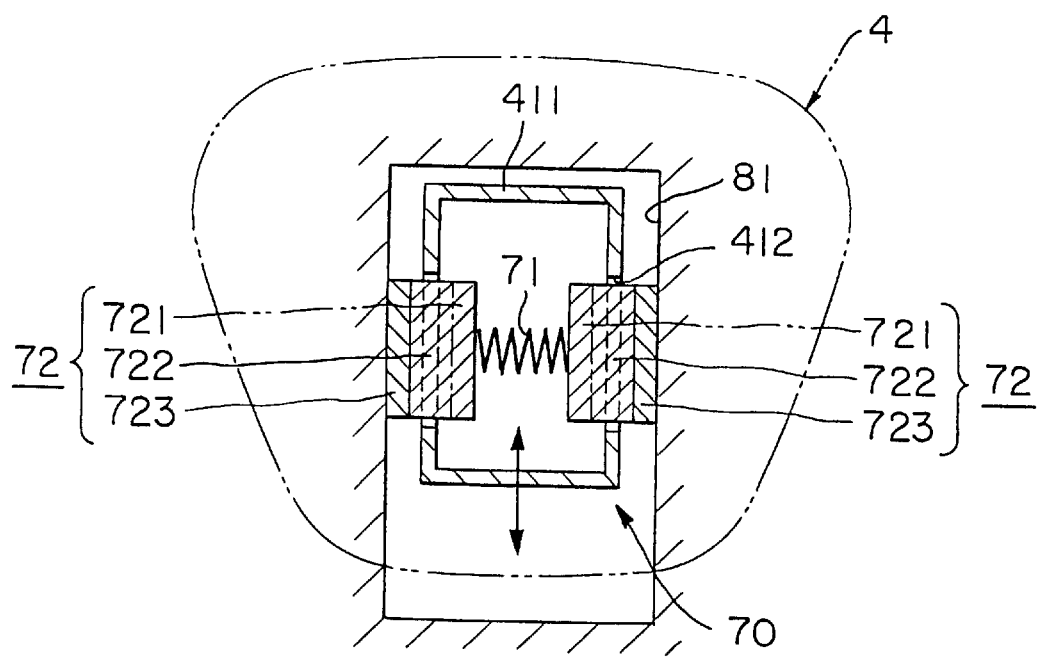
FIG. 7 is a sectional view taken on line B—B in FIG. 6.

FIG. 5 is a rear perspective view of a child car seat 1 provided with a headrest 4 in the second embodiment, FIG. 6 is a sectional view taken on line A—A in FIG. 5 and FIG. 7 is a sectional view taken on line B—B in FIG. 6.

The position of a headrest 4 in the second embodiment can be surely adjusted in a stepless mode by an inexpensive means.

The child car seat 1 shown in FIG. 5 has a child car seat body 3 and the headrest 4. The headrest 4 has a headrest body 41 and a pair of head supports 42 disposed symmetrically with respect to the center line of the headrest body 41. A housing 411 is placed on a lower part of the headrest body 41, and a vertical position adjusting mechanism 70 is placed in the housing 411. The pair of head supports 42 are rotatably supported by shafts 82, respectively, on the child car seat body 3.

The vertical position adjusting mechanism 70 includes a pair of locking members 72 supported on the headrest body 41, and a biasing member 71 interposed between the pair of locking members 72. Each locking member 72 is a substantially L-shaped member having an operating portion 721, a locking portion 722 and a frictional member 723. The locking members 72 are biased away from each other by the biasing member 71, such as a compression coil spring.

The locking portions 722 of the locking member 72 are extended through holes 412 (FIG. 7). The frictional members 723 attached to the free ends of the locking portions 722 face the child car seat body 3, are fitted in grooves 81 formed in the child car seat body 3, and are held firmly in place by high frictional force.

The operating portions 721 project from the back surface of the child seat body 3 and can be operated from behind the child car seat body 3.

The grooves 81 are formed vertically in surfaces of the child car seat body 3 facing the housing 411. The surfaces of the grooves 81 are highly frictional.

The biasing member 71 biases the locking members 72 so that the locking portions 722 project from the housing 411 and the frictional members 723 are pressed firmly against the surfaces of the grooves 81 of the child car seat body 3.

A method of adjusting the vertical position of the headrest body 41 relative to the child car seat body 3 by means of the vertical adjusting mechanism 70 will be described.

The operating portions 721 of the locking members 72 are moved toward each other by fingers against the biasing force of the biasing member 71 to disengage the frictional members 723 of the locking members 72 from the grooves 81 of the child car seat body 3. Then, the headrest body 41 is moved vertically by a distance to a desired height with the frictional members 723 disengaged from the grooves 81 and the locking members 72 are released. Consquently, the locking members 72 are biased away from each other by the biasing member 71, and the frictional members 723 are pressed against the surfaces of the grooves 81, so that the locking members 72 are held frictionally in place. Thus the height adjustment of the headrest body 41 can be completed.

The headrest body 41 in the second embodiment, similarly to that of the child car seat in the first embodiment, is provided with shoulder belt slots 5 through which the shoulder belts 54 are passed, and the shoulder belt slots 5 are moved by a desired distance as the headrest body 41 is moved by the same distance. Therefore, the shoulder belt slots 5 through which the shoulder belts 54 are passed do not need to be changed and the height of the headrest body 41 can be adjusted in a stepless mode.

Third Embodiment

A third embodiment of the present invention will be described with reference to FIGS. 8A to 9B.

Figure 9A:
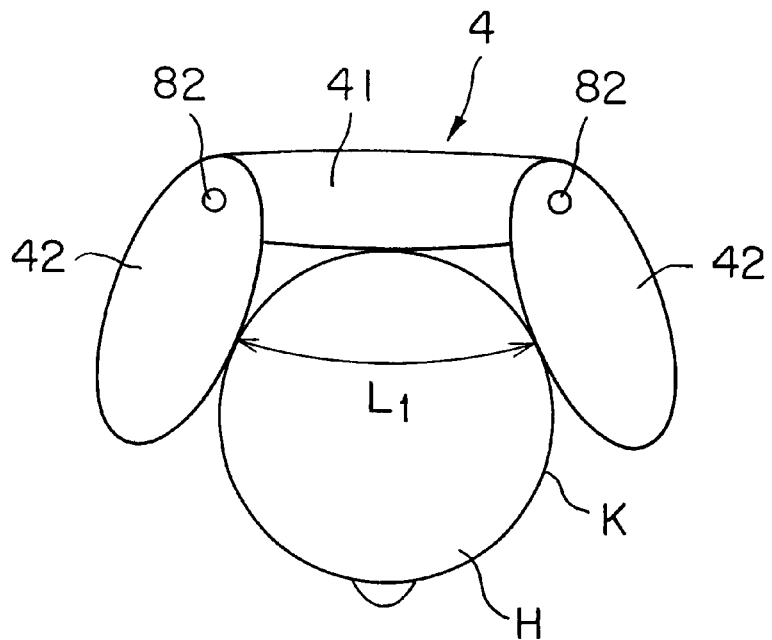
FIGS. 9A and 9B are views of assistance in explaining the operation of head supports and a headrest.
Figure 9B:
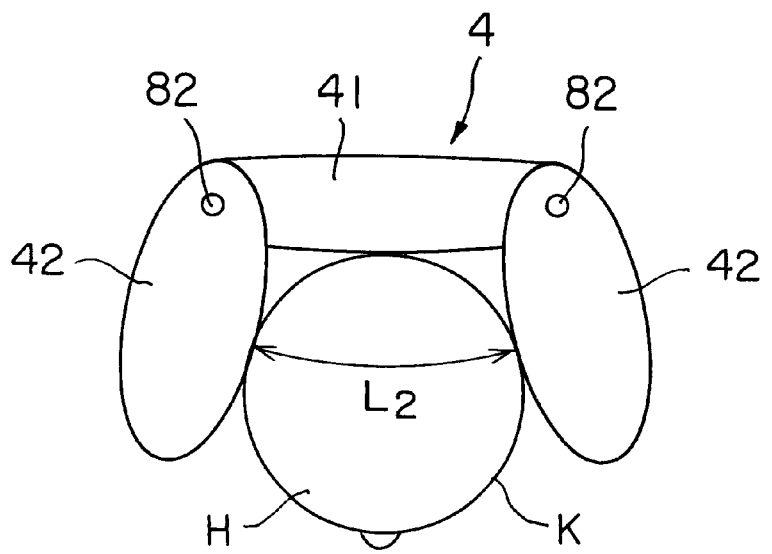

FIG. 8A is front elevation of assistance in explaining the positional relationship between a headrest and head supports, FIG. 8B is a sectional view taken on line B—B in FIG. 8A, FIG. 8C is an enlarged, fragmentary perspective view of a shaft shown in FIG. 8B, and FIGS. 9A and 9B are views of assistance in explaining the operation of head supports and a headrest.

Referring to FIGS. 8A to 9B, head supports 42 supported for rotation by shafts 82 on right and left end portions of a headrest body 41 included in a headrest 4 move vertically as the headrest body 41 is moved vertically. At the same time, the angular positions of the head supports 42 are adjusted.

As shown in FIG. 8A, the head supports 42 are disposed on the right and the left end of the headrest body 41 of the headrest 4, respectively. Each head support 42 is internally provided with a long bore 83 to receive the shaft 82 extended from a child car seat body 3. As shown in FIG. 8B, a grooved member 421 provided with a groove 421a is fitted in the long bore 83.

As mentioned above, the shafts 82 are fixed to right and left portions of the child car seat body 3 near the head supports 42 so as to extend vertically. Each shaft 82 is provided with a helical ridge 82a on its circumference as shown in FIG. 8C. The respective directions of the respective helical ridges 82a of the shafts 82 are opposite to each other.

When mounting the headrest body 41 on the child car seat body 3, the headrest body 41 is lowered so that the shafts 82 are inserted through the grooved members 421 of the head supports 42. The pair of head supports 42 may be connected for turning by pins, not shown, coaxial with the shafts 82 to the headrest body 41. At least the pair of head supports 42 and the headrest body 41 are moved together in vertical directions.

The shaft 82 provided with the helical projection 82a and the grooved member 421 constitute an angular position adjusting mechanism.

The right and the left head support 42 are turned as illustrated in FIGS. 9A and 9B.

When the headrest 4 is lowered, the headrest body 41 is lowered together with the pair of head supports 42 and the grooved members 421a are forced to turn (rotate) by the helical ridges 82a of the shaft 82 fixedly set on the child car seat body 3. Consequently, the right and the left head supports 42 are turned toward each other so that the space between the head supports 42 is narrowed.

Thus, the head supports 42 are turned automatically toward each other and the distance between the head supports 42 changes from $L_1$ to $L_2$ ($L_1 > L_2$) when the headrest body 41 is lowered for a small child K. Therefore, the head H of the small child K can be supported by three portions on the headrest body 41 and the head supports 42.

When the headrest 4 is raised, the headrest body 41 is raised together with the pair of head supports 42 and the grooved members 421a are forced to turn (rotate) by the helical ridges 82a of the shaft 82 fixedly set on the child car seat body 3.

The head supports 42 are turned away from each other and the distance between the head supports 42 changes from $L_2$ to $L_1$ ($L_1 > L_2$) when the headrest body 41 is raised for a large child K. Thus, the distance between the head supports 42 is increased when the headrest body 41 is raised for a large child K. Thus, the head H of the large child K can be securely supported by three portions on the headrest body 41 and the head supports 42.

Fourth Embodiment

A child car seat 1 in a fourth embodiment according to the present invention will be described with reference to FIGS. 10 to 12D.

In the fourth embodiment, the vertical position of an abdominal support 52 is adjusted when the vertical position of shoulder belts 54 are adjusted. A headrest body 41 included in a headrest 4 and the abdominal support 52 are interlocked by an interlocking mechanism 103 so that the abdominal support 52 is moved toward the headrest body 41 when the headrest body 41 is lowered and the abdominal support 52 is moved away from the headrest body 41 when the headrest body 41 is raised.

Figure 10:
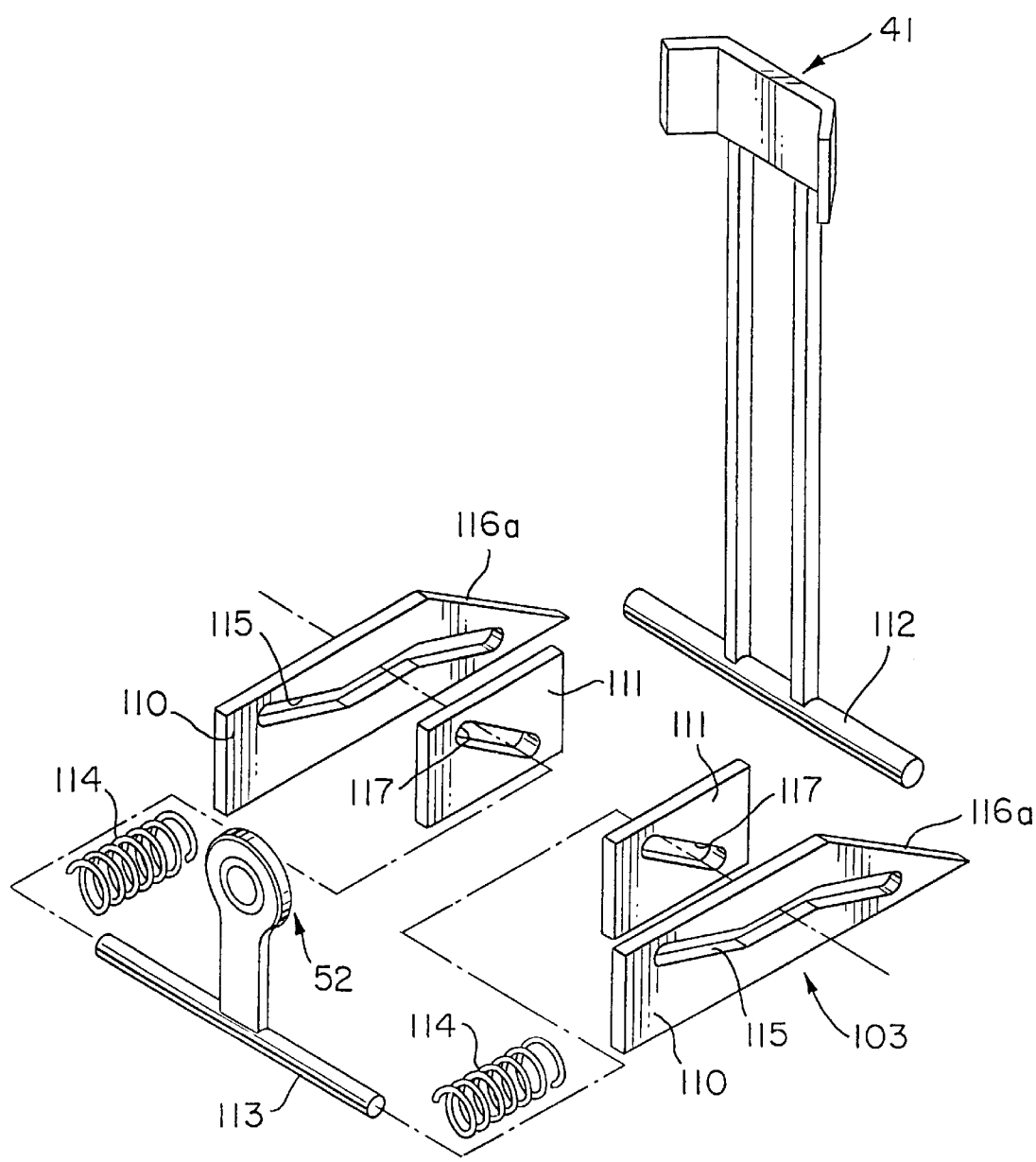
FIG. 10 is an exploded, conceptional perspective view of the components of an operating mechanism included in a child car seat in a fourth embodiment according to the present, invention.
Figure 11:
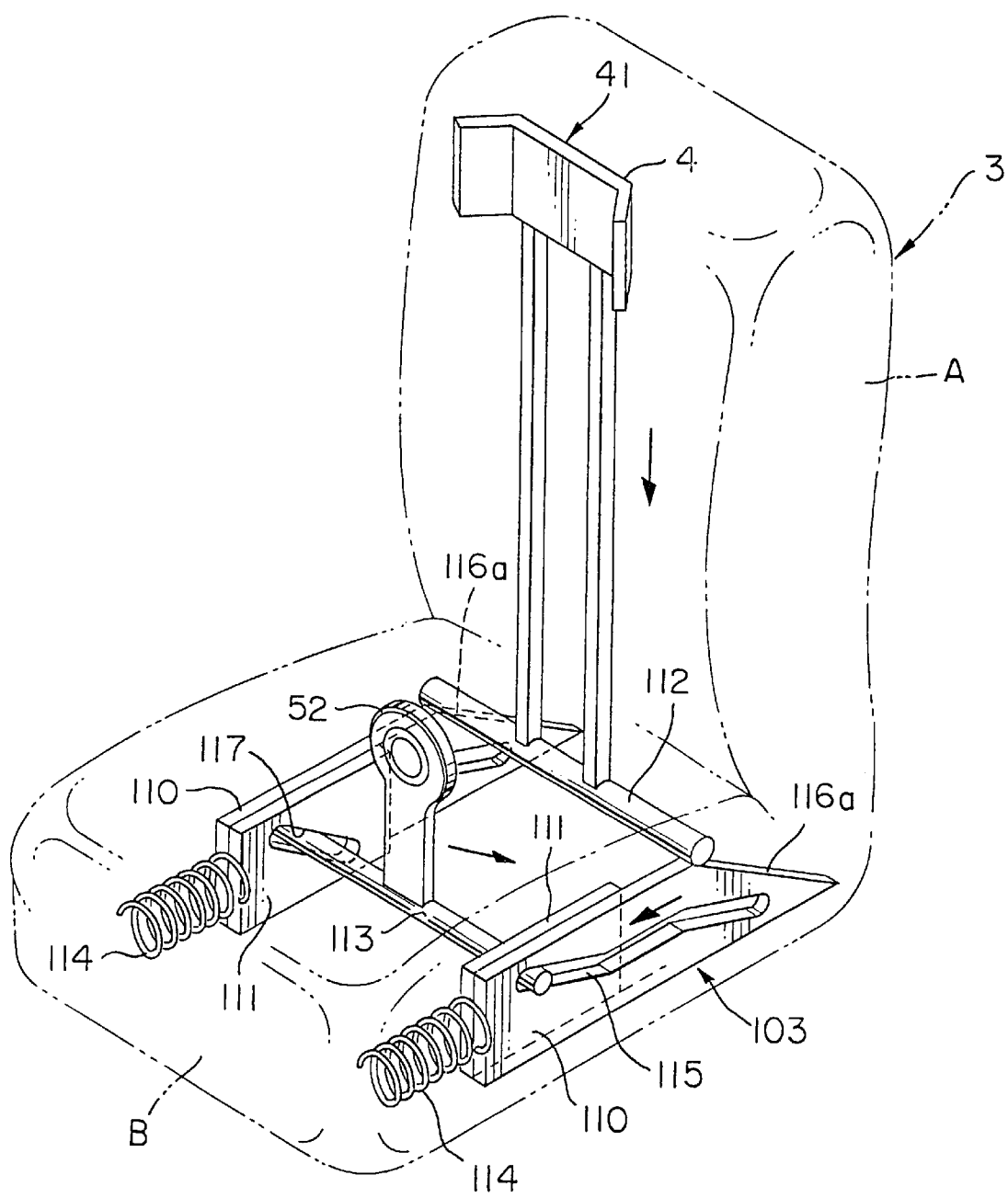
FIG. 11 is a perspective view of an assembly of the components of the child car seat shown in FIG. 10.

FIG. 10 is an exploded, conceptional perspective view of the components of an operating mechanism included in a child car seat in the fourth embodiment, FIG. 11 is a perspective view of an assembly of the components of the child car seat, and FIGS. 12A to 12D are a diagrammatic views of assistance in explaining operations of the components shown in FIG. 11.

Referring to FIG. 11, the child car seat 1 has a child car seat body 3 and a headrest 4. The child car seat body 3 has a seat back A and a seat cushion B.

The interlocking mechanism 103 of the child car seat 1 includes sliding plates (sliding members) 110 placed beside the opposite sides of the seat cushion B so as to move forward and backward, and guide plates (guide members) 111 extended along the sliding plates 110 and fixed to the sides of the seat cushion B. The headrest 4 has a headrest body 41 provided at the lower end thereof with a rod 112. The headrest body 41, the abdominal support 52 provided at its lower end with a rod 113 and the sliding plates 110 are biased toward the seat back A by springs 114.

Each sliding plate 110 is provided with a slot 115 sloping down toward the rear end of the seat cushion B. The rear end of the sliding plate 110 on the side of the seat back A is cut obliquely to form an inclined surface (cam surface) 116a.

Each guide plate 111 is provided with a slot 117 sloping down toward the rear end of the seat cushion B. The slots 117 of the guide plates 111 are sloped so as to intersect the corresponding slots 115 of the sliding plates 110.

As shown in FIG. 11, opposite end portions of the rod 113 of the abdominal support 52 are inserted in the slots 115 of the sliding plates 110 and the slots 117 of the guide plates 111. The sliding plates 110 are biased by the springs 114, and the rod 112 of the headrest body 41 is in contact with the cam surfaces 116a of the sliding plates 110.

Figure 12A:
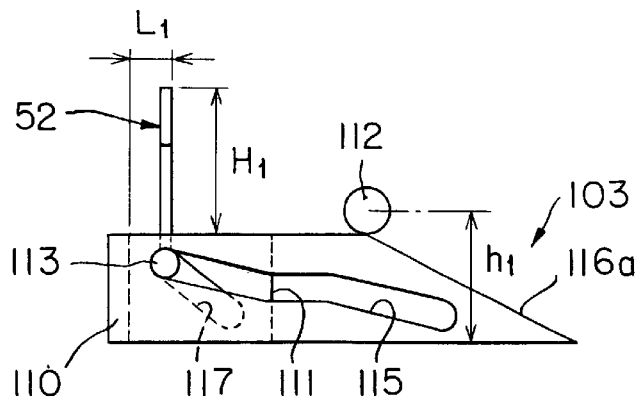
FIG. 12A is a diagrammatic view of assistance in explaining operations of the components shown in FIG. 11.

In the child car seat 1 thus constructed, the end portions of the rod 113 of the abdominal support 52 are at the forward ends of the slots 115 and 117 as shown in FIG. 12A, when the headrest body 41 of the headrest 4 is at its uppermost position. In this state, the abdominal support 52 is at a distance $L_1$ from a plane including the forward ends of the guide plates 111 and at a height $H_1$ from a plane including the upper surfaces of the guide plates 111. The abdominal support 52 is at an uppermost position farthest from the seat back A. In this state, the end portions of the rod 112 of the headrest body 41 are in contact with the highest positions on the cam surfaces 116a of the sliding plate 110. That is, the rod 112 is at the greatest height $h_1$ from a plane including the lower surfaces of the sliding plates 110.

Figure 12B:
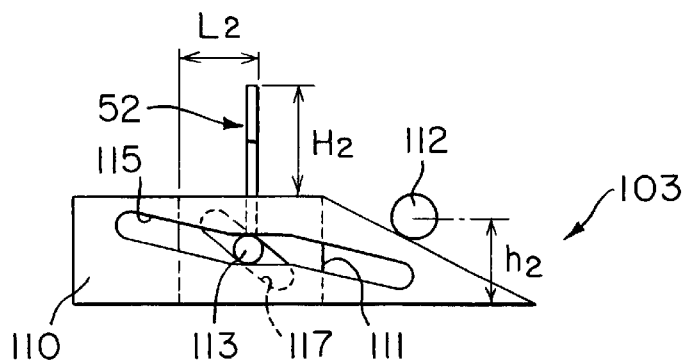
FIG. 12B is a diagrammatic view of assistance in explaining operations of the components shown in FIG. 11.

When the headrest body 41 is lowered from the position shown in FIG. 12A to lower the rod 112 to a height $h_2$, the sliding plates 110 are pushed to the left, as viewed in FIG. 12B, by the rod 112. Consequently, the intersections of the slots 115 of the sliding plates 110 and the slots 117 of the guide plates 111 are shifted toward the seat back A. As a result, the abdominal support 52 is shifted together with the rod 113 to a position at a distance $L_2$ from the plane including the forward ends of the guide plates 111 and at a height $H_2$ from the plane including the upper surfaces of the guide plates 111.

Figure 12C:
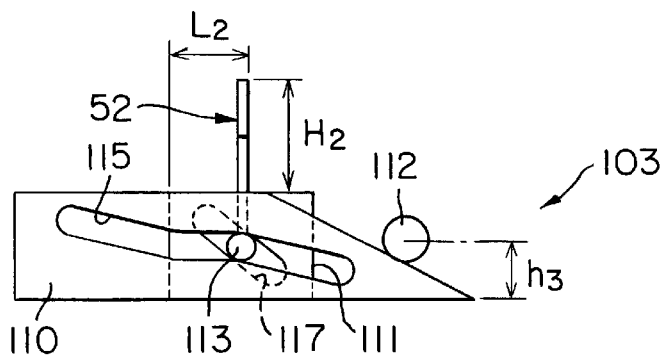
FIG. 12C is a diagrammatic view of assistance in explaining operations of the components shown in FIG. 11.

When the headrest body 41 is further lowered from the position shown in FIG. 12B to lower the rod 112 to a height $h_3$, the sliding plates 110 are pushed to the left, as viewed in FIG. 12C, by the rod 112. A section of the slot 115 of each sliding plate 110 along which the rod 113 relatively moves from a position shown in FIG. 12B to a position shown in FIG. 12C when the sliding plates 110 are pushed to the left, is parallel to the sliding direction of the sliding plates 110. Therefore the rod 113 remains at the same position and the position of the abdominal support 52 does not change. Thus, only the headrest body 41 is lowered to the position at the height $h_3$.

Figure 12D:
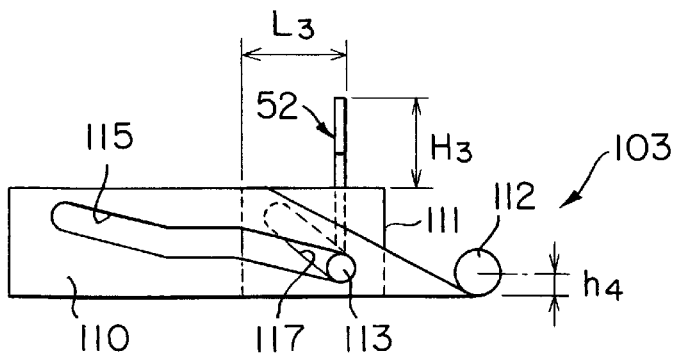
FIG. 12D is a diagrammatic view of assistance in explaining operations of the components shown in FIG. 11.
Figure 13:
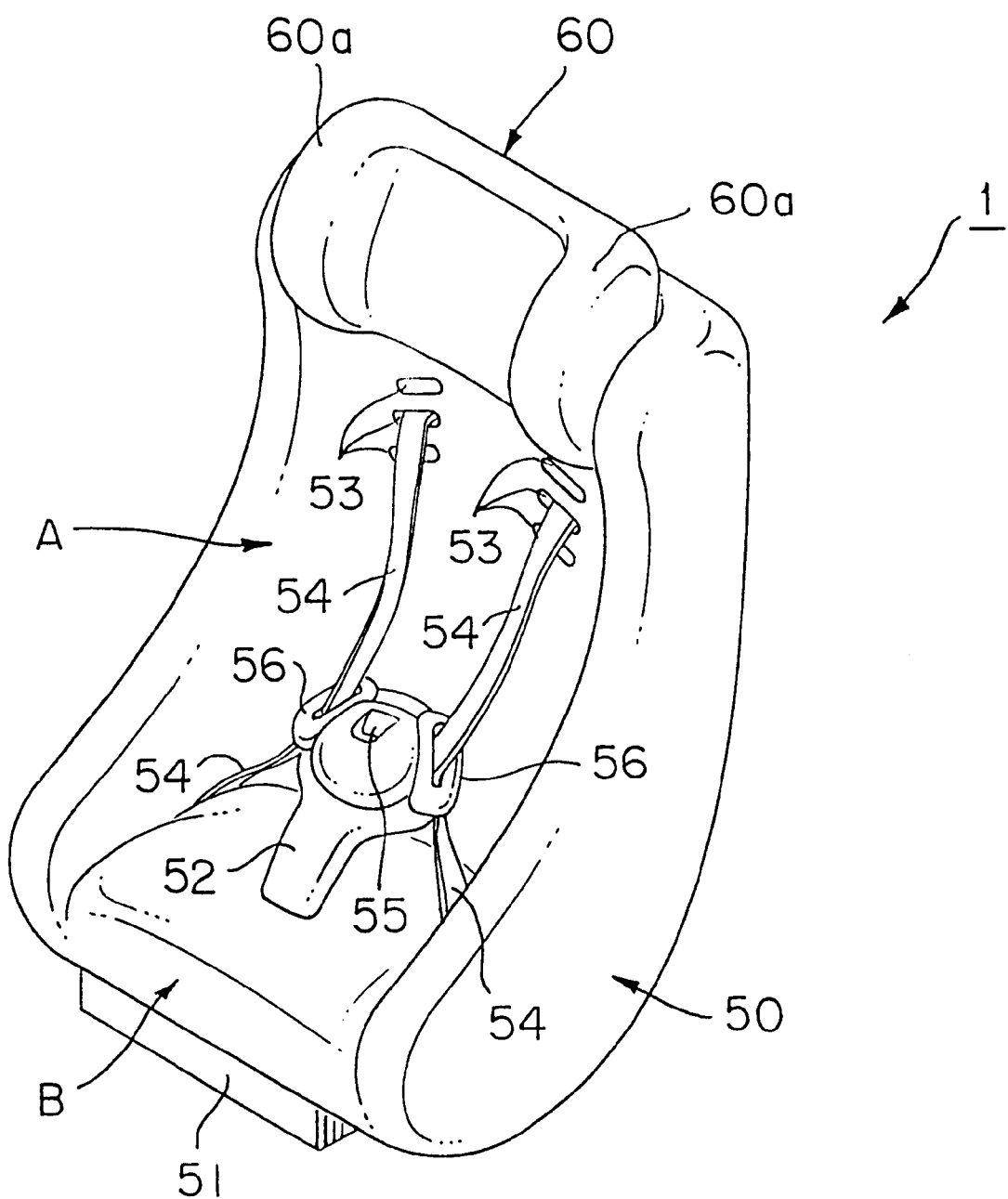
FIG. 13 is a front perspective view of a conventional child car seat.
Figure 14:
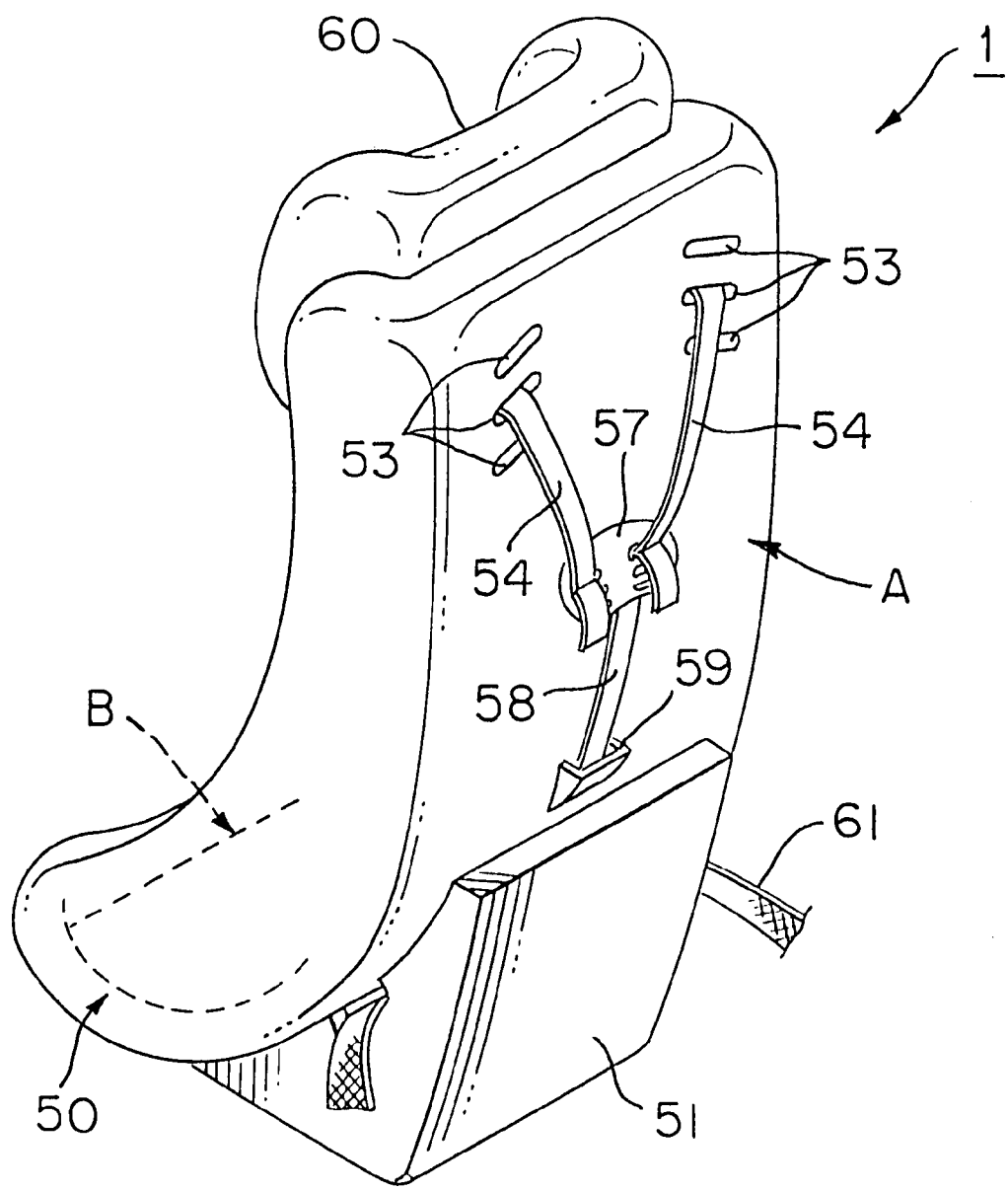
FIG. 14 is a rear perspective view of the conventional child car seat shown in FIG. 13.

When the headrest body 41 is lowered from the position shown in FIG. 12C to lower the rod 112 to a height $h_4$, the sliding plates 110 are pushed to the left, as viewed in FIG. 12D, by the rod 112. Consequently, the intersections of the slots 115 of the sliding plates 110 and the slots 117 of the guide plates 111 are shifted toward the seat back A, so that the abdominal support 52 is shifted together with the rod 113 to a position at a distance $L_3$ from the plane including the forward ends of the guide plates 111 and at a height $H_3$ from the plane including the upper surfaces of the guide plates 111.

When the headrest body 41 is moved upward, force from the headrest body 41 urging the sliding plate 110 to the left is removed and the sliding plates 110 are pushed back toward the seat back A by the resilience of the springs 114.

Since the headrest body 41 and the abdominal support 52 of this child car seat 1 are interlocked by the interlocking mechanism 103, the abdominal support 52 moves toward the seat back A when the headrest body 41 is lowered and the same moves away from the seat back A when the headrest body 41 is raised.

The child car seat in the first embodiment has the headrest provided in its middle part with the pair of shoulder belt slots, and the vertical position of the headrest relative to the child sheet body can be adjusted substantially in a stepless mode with the shoulder belts passed through the shoulder belt slots. Thus, the shoulder belt slots through which the shoulder belts are passed do not need to be changed and work for adjusting the vertical position of the shoulder belts is simplified.

More concretely, since the vertical movement of the headrest is converted into a rotating motion of the rotating member by the cooperative action of the laterally elongate groove formed in the lower part of the headrest and the boss fitted in the laterally elongate groove, and the polygonal head of the rotating member is locked at one of a plurality of angular positions, the vertical position of the headrest and the shoulder belt slots can be adjusted in a substantially stepless mode by the simple mechanism.

In the second embodiment, the vertical position of the headrest body of the headrest can be adjusted in a stepless mode by the simple means and the shoulder belt slots, similarly to those in the first embodiment, do not need to be changed and the work for the adjustment of the vertical position of the shoulder belts is simplified.

In the third embodiment, the head supports are turned automatically when the headrest is moved vertically according to the size of the child so that the space between the head supports is adjusted automatically according to the size of the child's head.

In the fourth embodiment, the abdominal support moves automatically relative to the seat back as the headrest is moved vertically according to the size of the child so as to reduce or increase the space between the abdominal support and the seat back accordingly. Thus, the space between the abdominal support and the headrest can be adjusted according to the size of the child.

According to the present invention, the space between the abdominal support and the seat back can be automatically adjusted according to the size of the child simply by adjusting the height of the headrest. Consequently, the child can be properly supported by the abdomen and the chest of the child by the abdominal support without requiring any special work.

What is claimed is:

1. A child car seat for supporting a child thereon, comprising:
    a child car seat body;
    an abdominal support to support a child's abdomen;
    a headrest mounted on said child car seat body to support the child's head; and
    structure for interconnecting said headrest and said abdominal support, said structure being operable to move said abdominal support toward said headrest as said headrest is lowered relative to said child car seat body.

2. The child car seat according to claim 1, further comprising a vertical position adjusting mechanism to adjust a vertical position of said headrest.

3. The child car seat according to claim 2, wherein said structure for interconnecting said headrest and said abdominal support is also operable to move said abdominal support away from said headrest as said headrest is raised.

4. The child car seat according to claim 3, wherein said structure for interconnecting said headrest and said abdominal support includes:
    first and second plates connected to respective opposite lateral sides of said child car seat body, each of said first and second plates having a slot therein;
    third and fourth plates positioned laterally outside of and movable relative to said first and second plates, respectively, each of said third and fourth plates having a slot therein and an inclined outer peripheral portion that slopes downwardly toward a rear end of said third and fourth plates, respectively;

a first rod that is connected to said headrest and is positioned to travel along said inclined outer peripheral portion of said third and fourth plates; and a second rod that is connected to said abdominal support and is receivable within each of the slots of said first, second, third and fourth plates.

5. The child car seat according to claim 4, wherein said vertical position adjusting mechanism comprises said first rod and said inclined outer peripheral portion of said third and fourth plates.

6. The child car seat according to claim 5, wherein said structure for interconnecting said headrest and said abdominal support further includes a spring to bias said third and fourth plates in a direction from a front end of said third and fourth plates toward the rear end of said third and fourth plates.

7. The child car seat according to claim 2, wherein said structure for interconnecting said headrest and said abdominal support includes:

first and second plates connected to respective opposite lateral sides of said child car seat body, each of said first and second plates having a slot therein;

third and fourth plates positioned laterally outside of and movable relative to said first and second plates, respectively, each of said third and fourth plates having a slot therein and an inclined outer peripheral portion that slopes downwardly toward a rear end of said third and fourth plates, respectively;

a first rod that is connected to said headrest and is positioned to travel along said inclined outer peripheral portion of said third and fourth plates; and a second rod that is connected to said abdominal support and is receivable within each of the slots of said first, second, third and fourth plates.

8. The child car seat according to claim 7, wherein said vertical position adjusting mechanism comprises said first rod and said inclined outer peripheral portion of said third and fourth plates.

9. The child car seat according to claim 8, wherein said structure for interconnecting said headrest and said abdominal support further includes a spring to bias said third and fourth plates in a direction from a front end of said third and fourth plates toward the rear end of said third and fourth plates.

10. The child car seat according to claim 1, wherein said structure for interconnecting said headrest and said abdominal support is also operable to move said abdominal support away from said headrest as said headrest is raised.

11. The child car seat according to claim 10, wherein said structure for interconnecting said headrest and said abdominal support includes:

first and second plates connected to respective opposite lateral sides of said child car seat body, each of said first and second plates having a slot therein;

third and fourth plates positioned laterally outside of and movable relative to said first and second plates, respectively, each of said third and fourth plates having a slot therein and an inclined outer peripheral portion that slopes downwardly toward a rear end of said third and fourth plates, respectively;

a first rod that is connected to said headrest and is positioned to travel along said inclined outer peripheral portion of said third and fourth plates; and a second rod that is connected to said abdominal support and is receivable within each of the slots of said first, second, third and fourth plates.

12. The child car seat according to claim 11, wherein said structure for interconnecting said headrest and said abdominal support further includes a spring to bias said third and fourth plates in a direction from a front end of said third and fourth plates toward the rear end of said third and fourth plates.

13. The child car seat according to claim 1, wherein said structure for interconnecting said headrest and said abdominal support includes:

first and second plates connected to respective opposite lateral sides of said child car seat body, each of said first and second plates having a slot therein;

third and fourth plates positioned laterally outside of and movable relative to said first and second plates, respectively, each of said third and fourth plates having a slot therein and an inclined outer peripheral portion that slopes downwardly toward a rear end of said third and fourth plates, respectively;

a first rod that is connected to said headrest and is positioned to travel along said inclined outer peripheral portion of said third and fourth plates; and a second rod that is connected to said abdominal support and is receivable within each of the slots of said first, second, third and fourth plates.

14. The child car seat according to claim 13, wherein said structure for interconnecting said headrest and said abdominal support further includes a spring to bias said third and fourth plates in a direction from a front end of said third and fourth plates toward the rear end of said third and fourth plates.

* * * * *